(12) United States Patent
Shah et al.

(10) Patent No.: US 6,414,940 B1
(45) Date of Patent: Jul. 2, 2002

(54) METHOD AND SYSTEM OF MANAGING UNIDIRECTIONAL FAILURES IN A DISTRIBUTED RESTORATION NETWORK

(75) Inventors: Jasvantrai C. Shah, Richardson; Lee Bengston, Murphy, both of TX (US)

(73) Assignee: MCI Communications Corporation, Jackson, MS (US)

( * ) Notice: Subject to any disclaimer, the term of this patent is extended or adjusted under 35 U.S.C. 154(b) by 0 days.

(21) Appl. No.: 09/046,089

(22) Filed: Mar. 23, 1998

Related U.S. Application Data

(63) Continuation of application No. 09/038,531, filed on Mar. 11, 1998.
(60) Provisional application No. 60/040,536, filed on Mar. 12, 1997.

(51) Int. Cl.⁷ ............................. H04J 3/14; G08C 25/02
(52) U.S. Cl. .................................................. 370/242
(58) Field of Search ................................. 370/216, 241, 370/242, 244, 245, 250

(56) References Cited

U.S. PATENT DOCUMENTS

| | | |
|---|---|---|
| 4,648,088 A | 3/1987 | Cagle et al. |
| 4,825,206 A | 4/1989 | Brice, Jr. et al. |
| 4,853,927 A | 8/1989 | Wenzel |
| 4,884,263 A | 11/1989 | Suzuki |
| 4,956,835 A | 9/1990 | Grover |
| 5,070,497 A | 12/1991 | Kleine-Altekamp |
| 5,146,452 A | 9/1992 | Pekarske |
| 5,173,689 A | 12/1992 | Kusano |
| 5,189,662 A | 2/1993 | Kleine-Altekamp |
| 5,212,475 A | 5/1993 | Thoma |
| 5,218,601 A | 6/1993 | Chujo et al. |
| 5,233,600 A | 8/1993 | Pekarske |
| 5,235,599 A | 8/1993 | Nishimura |
| 5,319,632 A | 6/1994 | Iwasaki |
| 5,325,366 A | 6/1994 | Shinbashi |
| 5,435,003 A | 7/1995 | Chng et al. |
| 5,455,832 A | 10/1995 | Bowmaster |
| 5,479,608 A | 12/1995 | Richardson |
| 5,493,273 A | 2/1996 | Smurlo et al. |
| 5,495,471 A | 2/1996 | Chow et al. |
| 5,537,532 A | 7/1996 | Chng et al. |
| 5,548,639 A | 8/1996 | Ogura |
| 5,586,112 A | 12/1996 | Tabata |
| 5,590,118 A | 12/1996 | Nederlof |

(List continued on next page.)

FOREIGN PATENT DOCUMENTS

| | | |
|---|---|---|
| WO | 96/41440 | 12/1996 |
| WO | 97/48189 | 12/1997 |

OTHER PUBLICATIONS

Bouloutas et al. "Alarm Correlation and Fault Identification in Communication Networks"; 1994 IEEE Transactions and Communications.

Manione et al.; "An Inconsistencies Tolerant Approach in the Fault Design of Telecommunications Network"; Feb. 14, 1994.

*Primary Examiner*—Hassan Kizou
*Assistant Examiner*—Ahmed Elallam

(57) ABSTRACT

In a distributed restoration environment, a node, upon detecting an alarm indicating a failure, after a predetermined period of time, converts the received alarm signal into a modified alarm signal and transmits the thus converted signal to the node adjacent thereto that should have received the same alarm signal to thereby effectively force the failure to be bidirectional if the original failure were a unidirectional failure. The converted signal is sent only after a predetermined period of time has passed to ensure that the failure detected indeed is an actual failure.

22 Claims, 7 Drawing Sheets

U.S. PATENT DOCUMENTS

| | | |
|---|---|---|
| 5,590,119 A | 12/1996 | Moran et al. |
| 5,598,403 A | 1/1997 | Tatsuki |
| 5,623,481 A | 4/1997 | Russ et al. |
| 5,636,203 A | 6/1997 | Shah |
| 5,636,206 A | 6/1997 | Amemiya et al. |
| 5,646,936 A | 7/1997 | Shah et al. |
| 5,657,320 A | 8/1997 | Russ et al. |
| 5,680,326 A | 10/1997 | Russ et al. |
| 5,710,777 A | 1/1998 | Gawne |
| 5,721,727 A | 2/1998 | Ashi et al. |
| 5,734,687 A | 3/1998 | Kainulainen |
| 5,748,611 A | 5/1998 | Allen et al. |
| 5,748,617 A | 5/1998 | McLain, Jr. |
| 5,757,774 A | 5/1998 | Oka |
| 5,781,535 A * | 7/1998 | Russ et al. ............ 370/248 |
| 5,802,144 A | 9/1998 | Laird et al. |
| 5,812,524 A | 9/1998 | Moran et al. |
| 5,832,196 A | 11/1998 | Croslin et al. |
| 5,838,660 A | 11/1998 | Croslin |
| 5,841,759 A | 11/1998 | Russ et al. |
| 5,850,505 A | 12/1998 | Grover et al. |
| 5,852,600 A * | 12/1998 | Russ ............ 370/228 |
| 5,862,362 A | 1/1999 | Somasegar et al. |
| 5,867,689 A | 2/1999 | McLain, Jr. |
| 5,875,172 A | 2/1999 | Tabata |
| 5,862,125 A | 6/1999 | Russ |
| 5,933,422 A | 8/1999 | Kusano et al. |
| 5,943,314 A | 8/1999 | Croslin |
| 5,986,783 A | 11/1999 | Sharma et al. |
| 5,991,338 A | 11/1999 | Trommel |
| 5,999,286 A | 12/1999 | Venkatesan |
| 6,021,113 A | 2/2000 | Doshi et al. |
| 6,026,073 A | 2/2000 | Brown et al. |
| 6,026,077 A | 2/2000 | Iwata |
| 6,044,064 A * | 3/2000 | Brimmage et al. ......... 370/248 |
| 6,049,529 A * | 4/2000 | Brimmage et al. ......... 370/248 |
| 6,061,735 A | 5/2000 | Rogers |
| 6,104,695 A | 8/2000 | Wesley et al. |
| 6,108,309 A | 8/2000 | Cohoe et al. |
| 6,137,775 A | 10/2000 | Barlett et al. |
| 6,154,448 A | 11/2000 | Peterson et al. |
| 6,167,025 A | 12/2000 | Hsing et al. |
| 6,337,846 B1 | 1/2002 | Bengston et al. |

* cited by examiner

M - FRAME OVERHEAD BIT SEQUENCE
56 OVERHEAD BITS OCCUPIES SEQUENTIAL
OVERHEAD BIT POSITIONS AS FOLLOWS:

X1, F1, C1, F2, C2, F3, C3, F4,
X2, F1, C1, F2, C2, F3, C3, F4,
P1, F1, C1, F2, C2, F3, C3, F4,
P2, F1, C1, F2, C2, F3, C3, F4,
M1, F1, C1, F2, C2, F3, C3, F4,
M2, F1, C1, F2, C2, F3, C3, F4,
M3, F1, C1, F2, C2, F3, C3, F4,

| | Transport Overhead | | | Path Overhead |
|---|---|---|---|---|
| Section Overhead | Framing A1 | Framing A2 | Trace/Growth (STS-ID) J0/Z0 | Trace J1 |
| | BIP-8 B1 | Orderwire E1 | User F1 | BIP-8 B3 |
| | Data Com D1 | Data Com D2 | Data Com D3 | Signal Label C2 |
| Line Overhead | Pointer H1 | Pointer H2 | Pointer Action H3 | Path Status G1 |
| | BIP-8 B2 | APS K1 | APS K2 | User Channel F2 |
| | Data Com D4 | Data Com D5 | Data Com D6 | Indicator H4 |
| | Data Com D7 | Data Com D8 | Data Com D9 | Growth Z3 |
| | Data Com D10 | Data Com D11 | Data Com D12 | Growth Z4 |
| | Sync Status/ Growth S1/Z1 | FEBE/Growth M0 or M1/Z2 | Orderwire E2 | Tandem Connection Z5 |

FIG. 4

METHOD AND SYSTEM OF MANAGING UNIDIRECTIONAL FAILURES IN A DISTRIBUTED RESTORATION NETWORK

This application continuation of U.S.C. 120 to commonly owned patent application Ser. No. 09/038,531 filed Mar. 11, 1998, which, in turn, claims priority under 35 U.S.C. 119(e) to provisional patent application Ser. No. 60/040,536 filed Mar. 12, 1997. The copending application Ser. No. 09/038,531 is herein incorporated by reference in its entirety.

FIELD OF THE INVENTION

This invention relates to distributed restoration algorithm (DRA) networks, and more particularly to a method and system therefor for determining the location of a fault when only a unidirectional alarm is received.

BACKGROUND OF THE INVENTION

In a telecommunication network, certain portions of it may be provisioned with the ability to restore traffic that has been disrupted due to a fault or a malfunction at a given location of the network. Such portion(s) of the network that has been so provisioned with the restoration ability is known as a distributed restoration algorithm (DRA) network, or domain. Oftentimes, instead of being referred to as a domain of a telecommunications network, a DRA network can be considered to stand on its own as it is connected to other networks. Each node, or cross connect switch, in the DRA domain is equipped with an algorithm and associated hardware that allow it to begin to look for a new path for restoring the disrupted traffic when it senses a fault. Each of the nodes is interconnected, by means of at least one link or span, to at least one other node. Thus, the plurality of nodes of a network are interconnected to other nodes by a plurality of links. In addition to routing traffic, the links, via associated equipment, also provide to each node signals that inform the node of the operational status of the network. In other words, signals are provided to each node to inform the node that traffic is being routed among the nodes effectively, or that there has been a malfunction somewhere in the network and that an alternate route or routes are required to reroute the disrupted traffic.

Conventionally, when everything is operating correctly, absence of a special set of signals indicating a malfunction would inform those nodes that traffic is being routed correctly. However, if a fault occurs somewhere in the network that disrupts the flow of traffic, an alarm is sent out from the fault location and propagated to nodes of the network. Such alarm signal causes the equipment in the network downstream of the fault location to go into alarm. To suppress the alarm in the downstream equipment, a followup signal is sent.

As disclosed in the aforenoted copending application, the conversion of the sensed alarm signal by a pair of adjacent nodes that bracket the fault enables the management of the network to readily identify the location of the fault. This signal conversion technique works fine so long as bidirectional alarm signals are generated as a result of the fault. Putting it differently, as long as the pair of custodial nodes each detect an alarm signal resulting from the fault, the location of the fault can be isolated. But in the case where malfunction has occurred to the equipment, for example, that transmits the fault signal to the custodial nodes so that only a unidirectional alarm signal is sent to one of the custodial nodes, this signal conversion technique is at a loss for determining the location of the fault.

Therefore, there is a need for a method, and system therefor, of handling the failure of a malfunctioned link if the signal that indicates the malfunction is sent in only one direction.

An objective of the present invention is therefore to provide a method, and system therefor, of managing unidirectional failures so that such failures can be converted into bidirectional notifications of a fault to both custodial nodes that bracket, or sandwich, the location.

SUMMARY OF THE INVENTION

Upon receipt of an incoming alarm signal, each node of the present invention DRA network initiates a timer for a predetermined period of time, at the end of which, if the alarm signal is a unidirectional signal from the fault and assuming that the node that has received the alarm signal is one of the two custodial nodes that bracket the fault, it is assumed that the other custodial node should have likewise received the alarm signal. After the predetermined period of time, the custodial node that received the alarm signal sends a modified alarm signal, which may be in the form of an idle signal with an embedded message that indicates an alarm signal of a unidirectional failure, back along the path from where the alarm signal was received. If the failure is unidirectional, the transmission of the modified alarm signal effectively forces the failure to be bidirectional because it replaces the non-failed signal with the modified alarm signal. If the failure is bidirectional, the modified alarm signal is still sent, but it has no effect because it simply reaches the break/failure point and stops. Upon receipt of the modified alarm signal, the other custodial node, even if it did not receive the alarm signal directly from the fault, recognizes that a fault has occurred and would then, per the aforenoted copending application, convert the modified alarm signal into an idle signal to be propagated to nodes downstream thereof.

The present invention therefore converts a unidirectional failure into a bidirectional failure so that each node of the custodial pair of nodes that bracket the fault would receive an alarm indicating that a fault has occurred irrespective of whether or not the original alarm from the fault was a unidirectional alarm signal.

BRIEF DESCRIPTION OF THE FIGURES

The above-mentioned objectives and advantages of the present invention will become more apparent and the invention itself will be best understood by reference to the following description of embodiments of the invention taken in conjunction with the accompanying drawings wherein:

FIG. 4 shows the format of a SONET Synchronous Transport Signal (STS-1) frame for enhancing the understanding of the conversion of an alarm signal into a non-alarm signal in a SONET network, as discussed in the aforenoted copending application;

DETAILED DESCRIPTION OF THE PRESENT INVENTION

Figure 1:
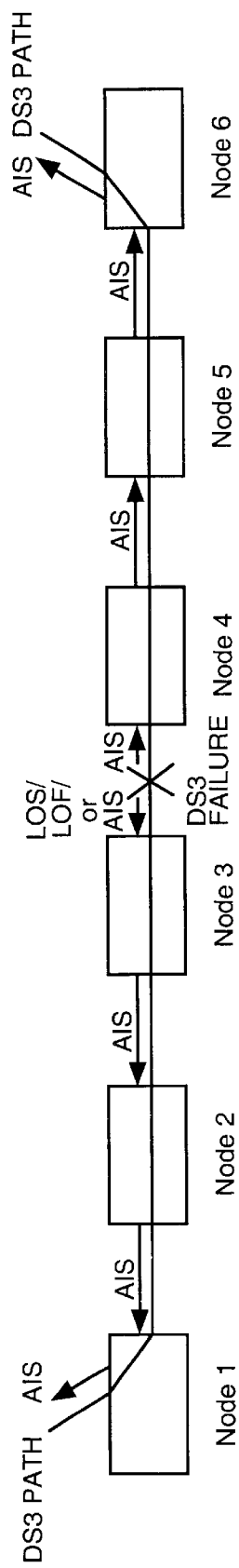
FIG. 1 shows a prior art exemplar distributed restoration network that has encountered a bidirectional failure.

With reference to FIG. 1, a Digital Signal 3 (DS3) path that connects node 1 to node 6 of a distributed restoration network is shown. For the sake of simplicity, no other nodes of the network, or other networks connected thereto, are shown.

As is well known, in a DRA network, when a fault occurs at a link interconnecting two adjacent nodes, an alarm is generated and sent to each of the adjacent nodes. Such a fault, or a malfunctioned link, is shown to have occurred as a failure between nodes 3 and 4 in FIG. 1. This failure may be due to for example a loss of signal (LOS) or a loss of frame (LOF) in the signal traversing between nodes 3 and 4. For the discussion of the instant invention, assume that such, an alarm signal is an Alarm Indication Signal (AIS).

In prior art DRA networks, each node of the network is provisioned to follow the standards set forth in the Bellcore document TR-NWT-00170 which mandate that each node downstream of the custodial nodes, such as nodes 3 and 4, upon receipt of an AIS signal, should propagate the signal to nodes downstream thereof. Thus, as shown in FIG. 1, upon receipt of the AIS signal, node 3 propagates the AIS signal to node 2, which in turn propagates it along the DS3 path to nodes downstream thereof. The same flow of the AIS signal received by node 4 occurs with respect to node 4, node 5 and node 6. For the illustration of FIG. 1, assume that node 1 and node 6 each are an access/egress node having access/egress ports for communicatively interconnecting the DRA network to other networks, or other portions of the network not provisioned for distributedly restoring disrupted traffic.

Figure 2:
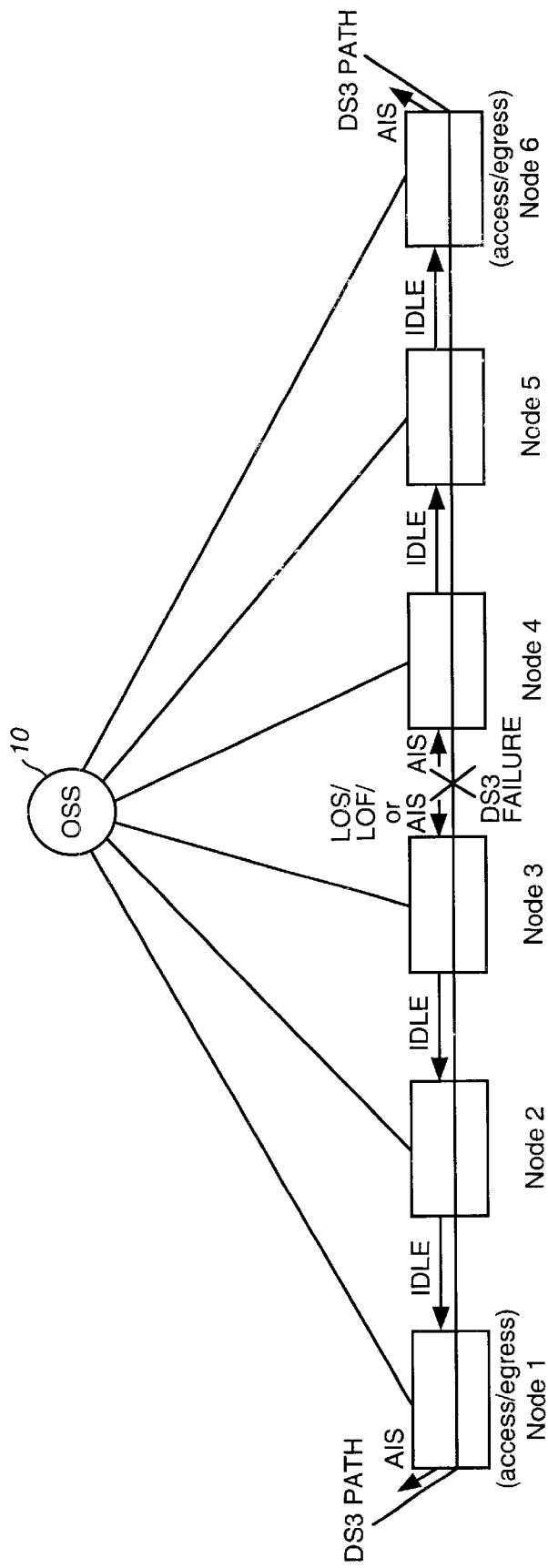
FIG. 2 illustrates the same nodes as shown in the FIG. 1 environment, but in this instance those nodes of the distributed restoration network each are provisioned to convert an incoming alarm signal into a non-alarm signal, and the access/egress nodes of the network are further provisioned to reconvert any received modified alarm signal back into an alarm signal.

As discussed in the aforenoted copending invention, shown as for example in FIG. 2, when a fault occurs either in a link connecting two adjacent nodes or at a location between two adjacent nodes, an alarm signal is sent bidirectionally to each of those adjacent nodes. In FIG. 2, it is shown that a fault has occurred in a link connecting nodes 3 and 4, and that an AIS signal is sent bidirectionally to nodes 3 and 4. Further as disclosed in the copending invention, upon detection of the AIS signal, each of the custodial nodes 3 and 4 converts the AIS signal into a non-alarm signal, such as an idle signal with an embedded message which may also be referred to as a modified idle signal. This modified idle signal is then propagated by the custodial nodes 3 and 4 to respective nodes 2 and 5 downstream thereof. Each of nodes 2 and 5, upon receipt of the modified idle signal, would further propagate the same to nodes downstream thereof, such as for example nodes 1 and 6, respectively.

As further shown in FIG. 2, each of nodes 1 and 6 is an access/egress node that interconnects the DRA network to other networks. For each of those access/egress nodes, when a modified idle signal is received thereat, upon detection that such modified idle signal in fact is not a conventional signal in view of the embedded message, the access/egress node would reconvert the modified idle signal back into an AIS signal, before propagating the AIS signal to nodes outside of the DRA network. A more detailed discussion of the FIG. 2 invention is given in the aforenoted copending application, the disclosure of which being incorporated by reference herein.

Figure 3:
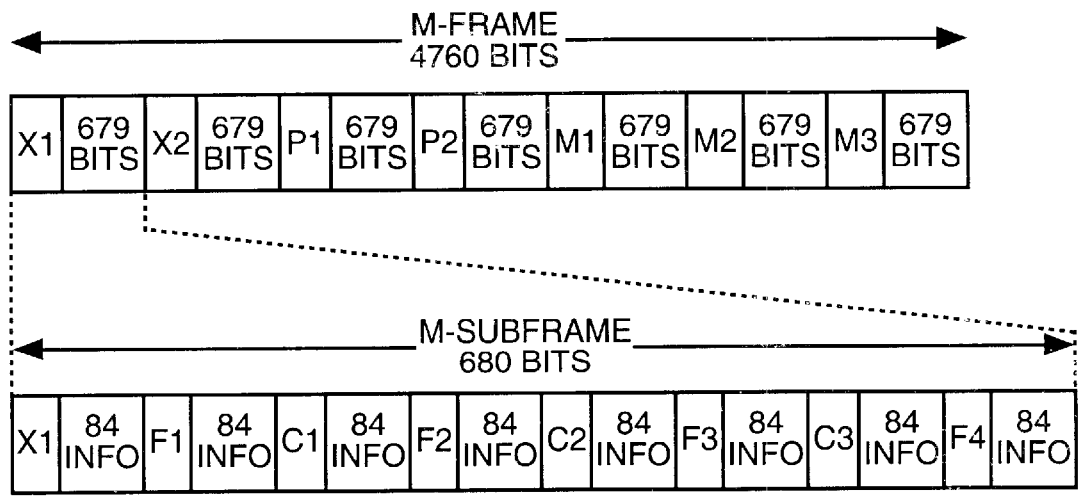
FIG. 3 shows a frame structure of a Digital Service-3 (DS3) signal for enhancing the understanding of the conversion of an alarm signal into a non-alarm signal in a DS3 format as taught in the aforenoted copending application.

FIG. 3 shows a DS3 frame structure promulgated under the American National Standard Institute (ANSI) standard T1.107-95. In particular, a DS3 signal is partitioned into M-frames of 4760 bits each. Each M-frames is divided into 7 M-subframes each having 680 bits. Each M-subframe in turn is further divided into 8 blocks of 85 bits with 84 of the 85 bits available for payload and one bit used for frame overhead. Thus, there are 56 frame overhead bits in a M-frame. These frame overhead bits are divided into a number of different channels: an M-frame alignment channel (M1, M2, M3), a M-subframe alignment channel (F1, F2, F3 and F4), a P-bit channel (P1 and P2), an X-bit channel (X1 and X2), and a C-bit channel (C1, C2 and C3).

Of interest in the instant invention, as well as the aforenoted copending invention, in the M-frame of FIG. 3 are the C-bit channel bits (C bits) C1, C2, and C3 which are used for creating the modified alarm signal and the modified idle signal. For example, ordinarily the C-bits are set to 0. Thus, by changing the state of at least one or more of those bits, different embedded messages may be effected in the modified alarm signal or modified idle signal.

As further disclosed in the aforenoted copending application, to convert an AIS signal into a modified idle signal or a modified alarm signal, the 9 C-bits (C1, C2 and C3) in the M-subframes 2(X2), 6(M2) and 7(M3) of the M-frame may be used. Thus, by changing the state of one or more of those C-bits in any one of the M-subframes 2, 6 or 7, or a combination thereof, the digital cross-connect switch, i.e. the node, can convert an incoming signal of one status to an outgoing signal of another status. For example, the idle signal that is converted by node 3 from a received AIS signal can have an embedded message, due to changes in the status of the C-bits, to reflect that the modified idle signal is representative of a fault that has already been detected and that it should be further propagated by nodes within the DRA network to other nodes until it reaches an access/egress node. At this point the access/egress node should reconvert such modified idle signal back into a conventional alarm signal before propagating it to nodes outside of the DRA network. As shown in FIG. 2, all operations of each of the nodes of DRA network are monitored by an operations support system (OSS) 10.

Even though the embodiment shown in FIG. 2 illustrates a DS3 network, as disclosed in the aforenoted copending application, the conversion of a bidirectional AIS signal into a modified alarm signal or modified idle signal can also be carried out in a DRA network interconnected by optical fibers, i.e. a SONET STS-n type network. The format for a STS-1 signal is shown in FIG. 4. And as disclosed in the aforenoted copending application, for this STS-n format, the Z5 byte is used for indicating the status of the idle signal that propagates from the custodial nodes of the fault. Thus, by changing the state of one or more of bits 5–8 of the Z5 byte, the modified idle signal from the custodial nodes, for example nodes 3 and 4 shown in FIG. 2, can carry different embedded messages.

As noted above, the signal conversion approach, per se, is useful in the case of a bidirectional alarm signal caused by a fault occurring between two custodial nodes. Yet for one reason or another, sometimes when a fault occurs, instead of a bidirectional alarm signal, a unidirectional signal is sent by the equipment that detects the fault to only one of the custodial nodes that bracket the fault. Thus, the reliance on alarm indications reaching both of the custodial nodes that bracket the fault for identifying the location of the fault, fails.

Figure 5:
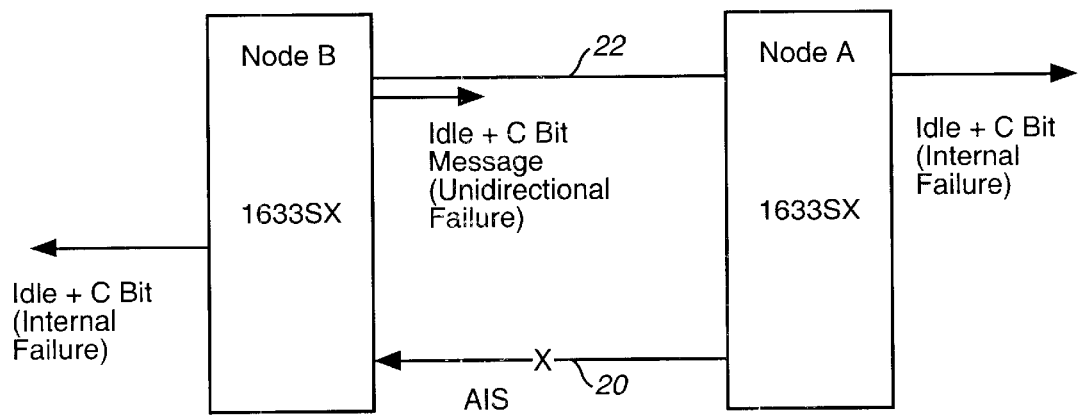
FIG. 5 illustrates a pair of adjacent nodes and the various signals traversing between those nodes for illustrating the present invention.

FIG. 5 provides an illustration of how a unidirectional failure can be converted into a bidirectional failure so that, even if only one of the custodial nodes that bracket a fault detects an alarm signal, such detection nonetheless will lead to the detection of an alarm by both of the custodial nodes so that the location of a fault in a DRA network can be readily identified, per disclosed in the aforenoted copending application.

With reference to FIG. 5, the two custodial nodes that bracket the fault X that occurred at a working link 20 are designated nodes A and B. As shown, a unidirectional alarm signal AIS is sent only to node B. Thus, as far as node A is concerned, no fault has occurred. As for node B, even though it has received the AIS signal, it does not know whether its counterpart custodial node A has also received the AIS signal. For this invention, assume that each of nodes A and B is a digital cross-connect switch such as the model 1633 SX made by the Alcatel Company. Since node B does not know whether node A has received an alarm signal, upon receipt of the AIS signal, it initiates a timer that counts a predetermined period of time to enable node B to confirm that the fault is an actual fault instead of just being a transient abnormality.

Meanwhile, as was discussed previously, node B converts the AIS signal into a modified idle signal by changing the state of one or more of the C bits so that the modified idle signal has embedded thereto a message that it is a signal that shows an internal failure having occurred in the DRA network. This modified idle signal then is propagated to nodes downstream of node B which, upon receipt of it, would propagate it to further downstream nodes until the modified idle signal reaches an access/egress node. The access/egress node, upon receipt of the modified idle signal, reads from its embedded message that an internal failure has occurred in the DRA network. To ensure that nodes outside of the DRA network are not affected, the access/egress node converts the modified idle signal back into an AIS signal before propagating it to the nodes outside the DRA network.

In the meantime, node B, at the end of the predetermined period of time, sends, by way of the good side of the working link a modified alarm signal to node A. This modified alarm signal includes an embedded message that informs node A that a unidirectional failure has been received by node B. Node A, upon receipt of this modified alarm signal, in addition to recognizing that a fault has occurred, converts this modified alarm signal with the unidirectional failure message into a modified idle signal that indicates that an internal failure has occurred in the DRA network, and further propagates this idle signal to nodes downstream thereof. Thus, with both of the custodial nodes A and B being cognizant of the fault occurring at working link 20, and the other nodes in the DRA network detecting a modified idle signal with an embedded internal failure message, the location of the fault can readily be identified.

It should be noted that the reason that node B converts the AIS signal into a modified alarm signal with an embedded unidirectional failure message for propagating to node A is because if node B were to retransmit the received AIS signal to node A, an infinite loop would result between nodes A and B as each of those nodes would continuously receive the AIS signals. Further, each of nodes A and B is provisioned to start its timer after receipt of a conventional AIS signal, because in a unidirectional failure scenario, it is only after the timer has expired that a modified alarm signal is sent by whichever node that has received the AIS signal to the node that has not, to thereby effectively force the failure to be bidirectional. Of course, if the failure is already bidirectional, any modified alarm signal sent would have no effect since such modified alarm signal would simply reach the break/failure point and stop.

Figure 6:
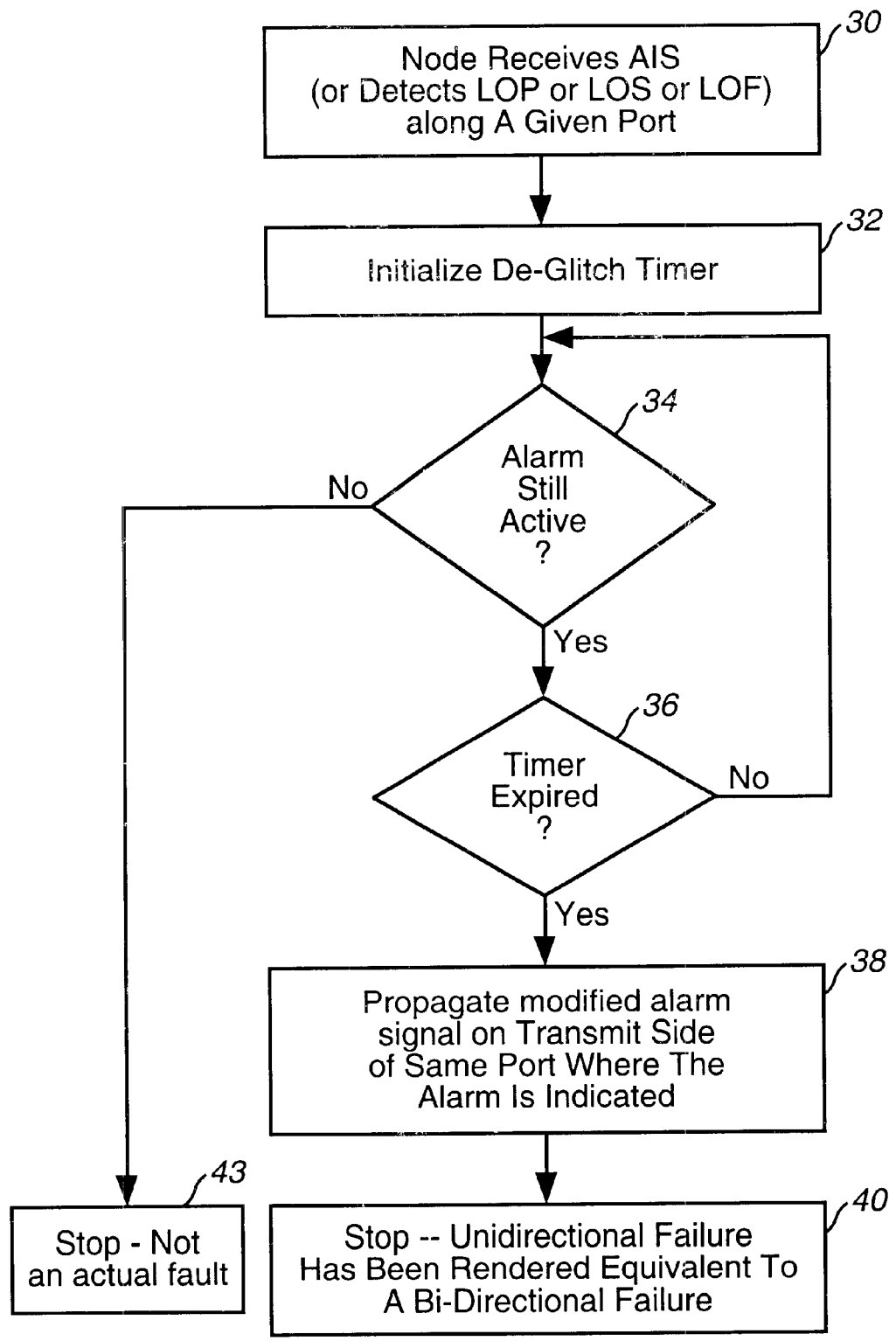
FIG. 6 is a flow chart of the operation of the present invention.

FIG. 6 is a flow chart that illustrates the operation of a custodial node that detected a unidirectional failure and the converting of this unidirectional failure into a bidirectional failure for identifying the exact location of the fault. To begin, at block 30, a node has received an AIS signal, or has detected a LOS or a LOF signal, along a given port of its transceiver unit. Upon receipt of the AIS signal, the node initiates a de-glitch timer to begin the count down of a predetermined period of time before it sends a modified alarm message with a unidirectional failure embedded message to its adjacent node along the path from where it received the AIS signal, per block 32. By setting a predetermined period of time, the at issue node makes sure that a fault is indeed a real fault. In other words, oftentimes what appears to be a fault in actuality is but a glitch that disappears shortly and is not an actual fault. A determination is therefore made in decision block 34 on whether or not the alarm remains active. If it is not, the process stops at block 43. However, if it is, a determination is made on whether the predetermined time has expired per decision block 36. If it has not, the process loops back to block 34 to again determine whether the alarm remains active. If the timer has indeed expired, then the process progresses to block 38 whereby a modified alarm signal is propagated along the transmit side of the same port where the alarm is indicated. Of course, this modified alarm signal in effect is an idle signal with an embedded unidirectional failure message that, to its adjacent custodial node, such as node A, acts as an AIS signal. The process then stops, as a unidirectional failure now has been rendered to be equivalent to a bidirectional failure, per block 40.

Figure 7:
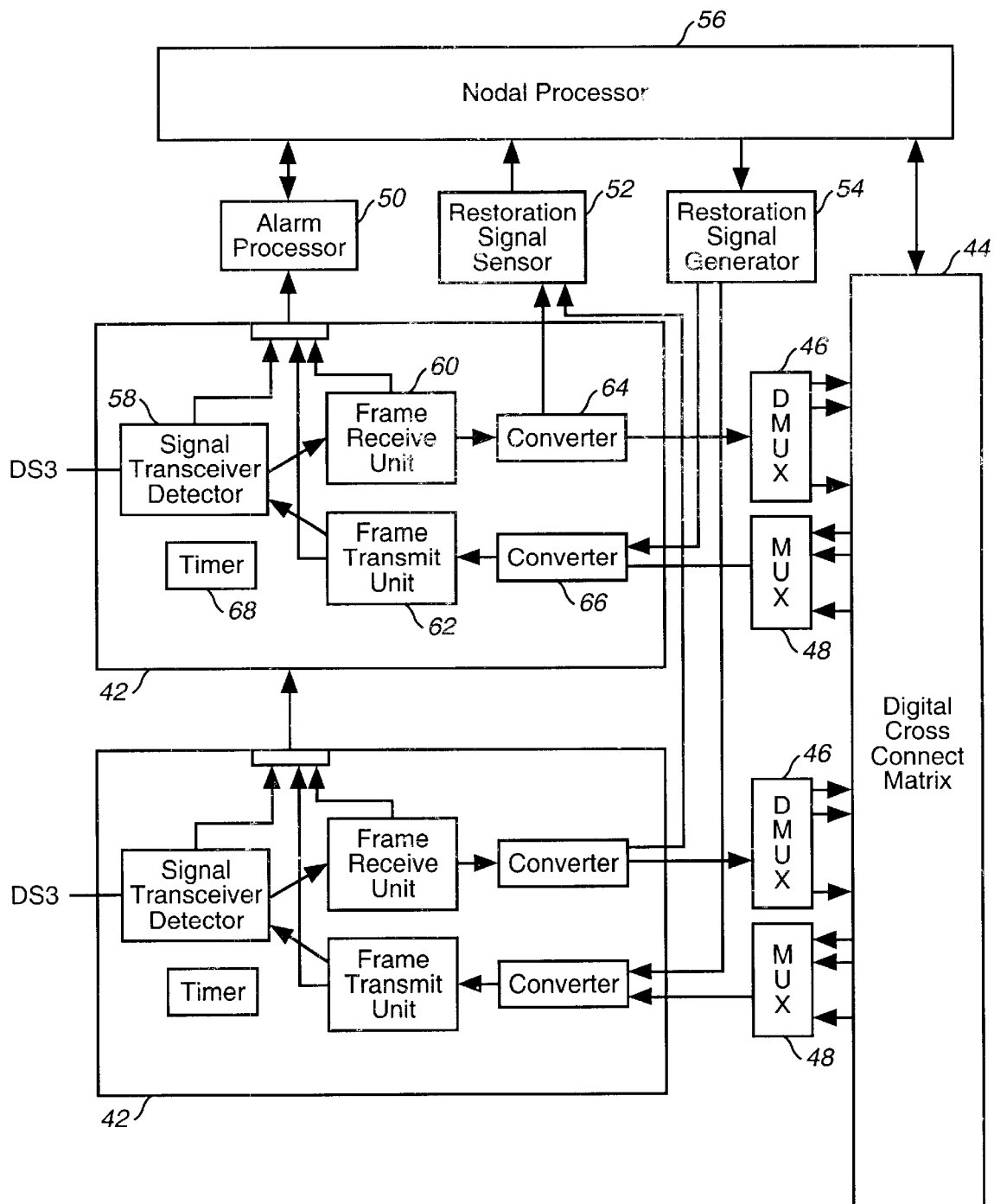
FIG. 7 is a block representation of a node in the distributed restoration network of the instant invention that has been provisioned to convert an alarm into a non-alarm signal, or another alarm signal to be sent to the custodial node that has not received the alarm signal resulting from the fault, and in the case of an access/egress node of the network, to convert a non-alarm signal back into an alarm signal.

An exemplar node of the instant invention is illustrated in FIG. 7. As shown, a number of transceiver units 42 are connected to a digital cross-connect matrix 44 by way of demultiplexers 46 and multiplexers 48. The transceiver units 42 each are connected to an alarm processor 50, a restoration signal sensor 52, and a restoration signal generator 54. The alarm processor 50, restoration signal sensor 52 and restoration signal generator 54 are connected to processor 56 of the node. The operation of the cross-connect switch 44 is controlled by a node processor 56.

Within each transceiver unit 42 there is a signal transceiver detector 58 in communication with a frame receive unit 60 and frame transmit unit 62. Frame receive unit 60 in turn is connected to a converter 64 while frame transmit unit 62 is connected to a converter 66. Also shown in each of the transceiver units 42 is a timer 68 which, once initiated, begins to count down the predetermined period of time for ascertaining the persistence of the detected fault. Since each of the transceivers 42 contains the same components and operates in the same way, only the operation of one of the transceiver units 42 is discussed hereinbelow.

In receipt of a signal, signal transceiver detector 58 determines whether the signal is an alarm signal or other type of signal. If the input signal is a conventional idle signal, such idle signal is passed to digital cross-connect switch 44 and propagated to nodes downstream of the node of the FIG. 7. If, however, the signal received from signal transceiver detector 58 is an alarm signal such as an AIS signal, alarm processor 50 is alerted and the received signal is routed to frame receive unit 60. There, the signal is parsed and forwarded to converter 64 where the AIS signal is converted into a non-alarm signal, such as the modified idle signal shown in FIG. 5 and discussed above. For propagation to nodes downstream thereof, the node of FIG. 7 converts the input AIS signal into an idle signal with an embedded internal failure message per converter 64. This modified idle message is then forwarded to the multiplexer 46 and to the appropriate output port of digital cross-connect matrix 44 for propagation to nodes downstream thereof.

At the time that an AIS signal is received by signal transceiver detector 58, timer 68 is initiated to count down a predetermined period of time for ensuring that the received AIS signal is representative of an actual fault. At the end of the predetermined period of time, a modified alarm signal with an embedded unidirectional failure message is sent on the transmit side of the same port where the alarm is indicated to the other custodial node, in order to render a unidirectional failure into a bidirectional failure, so that the location of the fault in the DRA network can be ascertained.

The node of FIG. 7 is also provisioned to act as an access/egress node so that, if it receives an idle signal with an embedded internal failure message from a node upstream thereof in the DRA network, it will convert that modified idle signal into an AIS signal for propagation to the nodes outside of the DRA network. If an access/egress node were to receive a conventional idle signal, the same idle signal is propagated to nodes downstream thereof outside the DRA network. Also note that even though the node of FIG. 7 is shown to be operating in a DS3 environment, it could likewise operate in a STS-n environment.

While a preferred embodiment of the present invention has been disclosed for purposes of explanation, numerous changes, modifications, variations, substitutions and equivalents in whole or in part, should now be apparent to those skilled in the art to which the invention pertains. Accordingly, it is intended that the invention be limited only by the spirit and scope of the hereto attached claims.

What is claimed is:

1. In a telecommunications network having a plurality of interconnected nodes, a method of ensuring that both custodial nodes bracketing a fault are aware of an alarm resulting from said fault, comprising the steps of:
    provisioning each of said nodes, in receipt of an alarm signal,
        to wait a predetermined amount of time to ascertain that said alarm signal designates an actual fault; and
        to output an other alarm signal toward the direction from where said alarm signal was received by said each node, wherein said other alarm signal is a modified alarm signal with an embedded message that indicates to said custodial node on the other side of said fault that it should be treated as an alarm signal.

2. The method of claim 1, further comprising the step of: provisioning said each node, in receipt of said alarm signal, to convert said alarm signal into a non-alarm signal for propagation to nodes downstream thereof.

3. The method of claim 2, wherein said network is connected to other networks, further comprising the step of: provisioning each access/egress node that interconnects said network to said other networks with the functionality to convert any non-alarm signal converted from any alarm signal by said each node back into said any alarm signal before propagating said reconverted any alarm signal to nodes in said other networks.

4. The method of claim 3, wherein said any alarm signal is an Alarm Indication Signal (AIS) and said converted non-alarm signal is an Idle signal with an embedded message that is different from a conventional Idle signal.

5. The method of claim 2, wherein said alarm signal is a Digital Service 3 (DS3) signal divided into a plurality of frames each having a number of C bits, and wherein said each node converts said alarm signal into said non-alarm signal, the state of at least one of said C bits in said non-alarm signal being different from the state of the same C bit in said alarm signal so that said converted non-alarm signal has a different embedded message than a conventional non-alarm signal.

6. The method of claim 2, wherein said alarm signal is a Sonet (STS-1) signal divided into a plurality of frames each having a number of Z bytes, and wherein said each node converts said alarm signal into said non-alarm signal, the state of at least one of said Z bytes in said non-alarm signal being different from the state of the same Z bytes in said alarm signal so that said converted non-alarm signal has a different embedded message than a conventional non-alarm signal.

7. In a telecommunications network having a plurality of interconnected nodes provisioned to restore traffic disrupted by a fault occurring between two adjacent nodes, each node of said network comprising:
    means for detecting an alarm and from which direction said alarm comes;
    means for delaying any response to said alarm for a predetermined time; and
    means for outputting an other alarm signal toward the node adjacent said each node in the direction from where said alarm came, wherein said other alarm signal is a modified alarm signal with an embedded message that indicates to said custodial node on the other side of said fault that it should be treated as an alarm signal.

8. The network of claim 7, wherein said each node further comprises:
    means for converting said alarm signal into a non-alarm signal for propagation to nodes downstream thereof in receipt of an alarm signal.

9. The network of claim 8, wherein said network is connected to other networks, further comprising:
    at least one access/egress node interconnecting said network to said other networks with the functionality to convert any non-alarm signal converted from an alarm signal by said each node back into said alarm signal before propagating said reconverted alarm signal to nodes in said other networks.

10. The network of claim 8, wherein said alarm signal is an Alarm Indication Signal (AIS) and said converted non-alarm signal is an Idle signal with an embedded message that is different from a conventional Idle signal.

11. The network of claim 8, wherein said alarm signal is a Digital Service 3 (DS3) signal divided into a plurality of frames each having a number of C bits, and wherein said each node converts said alarm signal into said non-alarm signal, the state of at least one of said C bits in said non-alarm signal being different from the state of the same C bit in said alarm signal so that said converted non-alarm signal has a different embedded message than a conventional non-alarm signal.

12. The network of claim 8, wherein said alarm signal is a Sonet (STS-1) signal divided into a plurality of frames each having a number of Z bytes, and wherein said each node converts said alarm signal into said non-alarm signal, the state of at least one of said Z bytes in said non-alarm signal being different from the state of the same Z byte in said alarm signal so that said converted non-alarm signal has a different embedded message than a conventional non-alarm signal.

13. A method of changing a unidirectional failure in a telecommunications network provisioned to restore disrupted traffic to a bidirectional failure in order to isolate a fault occurring in said network, comprising the steps of:

(a) provisioning each node of said network to convert a received alarm signal to a non-alarm signal for propagation to nodes downstream thereof, (b) provisioning said each node to wait a predetermined period of time before outputting an other alarm signal to the node adjacent said each node back along the path from where said received alarm signal was sent, said each node and said adjacent node together forming the pair of custodial nodes bracketing the fault that caused said alarm signal, wherein said other alarm signal is a modified alarm signal with an embedded message that indicates to said custodial node on the other side of said fault that it should be treated as an alarm signal.

14. The method of claim 13, wherein said network is connected to other networks, further comprising the step of:

provisioning each access/egress node that interconnects said network to said other networks with the functionality to convert any non-alarm signal converted from any alarm signal by said each node back into said any alarm signal before propagating said reconverted any alarm signal to nodes in said other networks.

15. The method of claim 13, wherein said alarm signal is a Digital Service 3 (DS3) signal divided into a plurality of frames each having a number of C bits, and wherein said each node converts said alarm signal into said non-alarm signal, the state of at least one of said C bits in said non-alarm signal being different from the state of the same C bit in said alarm signal so that said converted non-alarm signal has a different embedded message than a conventional non-alarm signal.

16. The method of claim 13, wherein said alarm signal is a Sonet (STS-1) signal divided into a plurality of frames each having a number of Z bytes, and wherein said each node converts said alarm signal into said non-alarm signal, the state of at least one of said Z byte in said non-alarm signal being different from the state of the same Z byte in said alarm signal so that said converted non-alarm signal has a different embedded message than a conventional non-alarm signal.

17. In combination, a distributed restoration (DRA) network connected to at least one other telecommunications network, each node of said DRA network comprising:

means for detecting the receipt of an alarm signal;

means for converting said received alarm signal to a non-alarm signal for propagation to nodes downstream thereof;

means for counting a predetermined period of time; and means for outputting an other alarm signal to the node adjacent said each node back along the path from where the received alarm signal was sent, said each node and said adjacent node together forming the pair of custodial nodes bracketing the fault that caused said alarm signal, wherein said other alarm signal is a modified alarm signal with an embedded message that indicates to said custodial node on the other side of said fault that it should be treated as an alarm signal.

18. The combination of claim 17, further comprising:

at least one access/egress node interconnecting said DRA network to said other network provisioned to convert any non-alarm signal converted from any alarm signal by said each node back into said any alarm signal before propagating said reconverted any alarm signal to nodes in said other network.

19. The combination of claim 17, wherein said alarm signal is a Digital Service 3 (DS3) signal divided into a plurality of frames each having a number of C bits, and wherein said each node converts said alarm signal into said non-alarm signal, the state of at least one of said C bits in said non-alarm signal being different from the state of the same C bit in said alarm signal so that said converted non-alarm signal has a different embedded message than a conventional non-alarm signal.

20. The combination of claim 17, wherein said alarm signal is a Sonet (STS-1) signal divided into a plurality of frames each having a number of Z bytes, and wherein said each node converts said alarm signal into said non-alarm signal, the state of at least one of said Z bytes in said non-alarm signal being different from the state of the same Z byte in said alarm signal so that said converted non-alarm signal has a different embedded message than a conventional non-alarm signal.

21. In combination, a distributed restoration (DRA) network connected to at least one other telecommunications network, each node of said DRA network comprising:

means for detecting the receipt of an alarm signal;

means for converting said received alarm signal to a non-alarm signal for propagation to nodes downstream thereof;

means for counting a predetermined period of time; and means for outputting an other alarm signal to the node adjacent said each node back along the path from where the received alarm signal was sent, said each node and said adjacent node together forming the pair of custodial nodes bracketing the fault that caused said alarm signal, wherein said alarm signal is an Alarm Indication Signal (AIS) and said converted non alarm signal is an Idle signal with an embedded message that is different from a conventional idle signal.

22. A method of changing a unidirectional failure in a telecommunications network provisioned to restore disrupted traffic to a bidirectional failure in order to isolate a fault occurring in said network, comprising the steps of:

(a) provisioning each node of said network to convert a received alarm signal to a non-alarm signal for propagation to nodes downstream thereof;

(b) provisioning said each node to wait a predetermined period of time before outputting an other alarm signal to the node adjacent said each node back along the path from where said received alarm signal was sent, said each node and said adjacent node together forming the pair of custodial nodes bracketing the fault that caused said alarm signal, wherein said alarm signal is an Alarm Indication Signal (AIS) and said converted non alarm signal is an Idle signal with an embedded message that is different from a conventional idle signal.

* * * * *